(12) United States Patent
Anderson et al.

(10) Patent No.: US 11,040,545 B2
(45) Date of Patent: *Jun. 22, 2021

(54) FLUID LEVEL SENSING DEPENDENT ON WRITE COMMAND

(71) Applicant: HEWLETT-PACKARD DEVELOPMENT COMPANY, L.P., Houston, TX (US)

(72) Inventors: Daryl E. Anderson, Corvallis, OR (US); James Michael Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/094,549

(22) PCT Filed: Jul. 14, 2016

(86) PCT No.: PCT/US2016/042318
§ 371 (c)(1),
(2) Date: Oct. 18, 2018

(87) PCT Pub. No.: WO2018/013123
PCT Pub. Date: Jan. 18, 2018

(65) Prior Publication Data
US 2019/0118545 A1    Apr. 25, 2019

(51) Int. Cl.
*B41J 2/175*     (2006.01)
*G01F 23/00*     (2006.01)
(Continued)

(52) U.S. Cl.
CPC ...... *B41J 2/17566* (2013.01); *G01F 23/0007* (2013.01); *G01F 23/0061* (2013.01);
(Continued)

(58) Field of Classification Search
CPC .......................... B41J 2/17566; G01F 23/0076
See application file for complete search history.

(56) References Cited

U.S. PATENT DOCUMENTS 4,382,382 A * 5/1983 Wang .................... G01F 23/243
                                                  340/620
4,908,783 A * 3/1990 Maier ................. G01F 23/0076
                                                  324/71.1
(Continued)

FOREIGN PATENT DOCUMENTS

EP       0881079 A2    12/1998
JP       H02165954 A    6/1990
(Continued)

*Primary Examiner* — Lam S Nguyen
(74) *Attorney, Agent, or Firm* — Fabian VanCott

(57) ABSTRACT

In one example a fluid level sensing device is described. The device includes a sensing die having a number of fluid level sensors disposed thereon and a number of control devices, each control device corresponding to one of the number of fluid level sensors. A control device includes a comparing device to determine a state of a corresponding fluid level sensor. A state of the fluid level sensor is selected from the group consisting of a fluid state and a no fluid state. Each control device also includes a non-volatile memory device corresponding to the comparing device to indicate whether the corresponding fluid level sensor is at the fluid state or the no fluid state. A control device also includes a locking device to receive a write command and to irreversibly set the non-volatile memory device to the no fluid state based on the write command.

19 Claims, 7 Drawing Sheets

(51) Int. Cl.
   *G01F 23/22*        (2006.01)
   *G01F 25/00*        (2006.01)
(52) U.S. Cl.
   CPC .......... *G01F 23/0069* (2013.01); *G01F 23/22*
              (2013.01); *G01F 25/0061* (2013.01); *B41J*
              *2002/17579* (2013.01); *G01F 25/0076*
                                              (2013.01)

(56) References Cited

U.S. PATENT DOCUMENTS

| | | | |
|---|---|---|---|
| 5,617,121 A | 4/1997 | Tachihara | |
| 6,247,775 B1 | 6/2001 | Walker | |
| 6,585,359 B1 | 7/2003 | Gasvoda et al. | |
| 7,059,696 B2 * | 6/2006 | Eguchi | B41J 2/17566 347/19 |
| 7,286,249 B2 | 10/2007 | Engel | |
| 7,448,748 B2 | 11/2008 | Silverbrook et al. | |
| 8,215,734 B2 | 7/2012 | Asauchi | |
| 2004/0212643 A1 | 10/2004 | King et al. | |
| 2005/0225614 A1 * | 10/2005 | Oomura | B41J 2/17566 347/86 |
| 2005/0259123 A1 | 11/2005 | Rice et al. | |

FOREIGN PATENT DOCUMENTS

| | | |
|---|---|---|
| WO | WO-2010077387 | 7/2010 |
| WO | WO-2014084843 A1 | 6/2014 |
| WO | WO-2015119594 | 8/2015 |

\* cited by examiner

FLUID LEVEL SENSING DEPENDENT ON WRITE COMMAND

BACKGROUND

Fluid reservoirs are used to contain various types of fluids. For example, in printing systems, print cartridges hold stores of printing fluid such as ink. The ink, or other printing fluid from a reservoir, is supplied to a printhead which deposits the printing fluid onto a medium, such as paper. As the printing fluid is deposited onto the medium, the printing fluid is depleted from the fluid reservoir.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
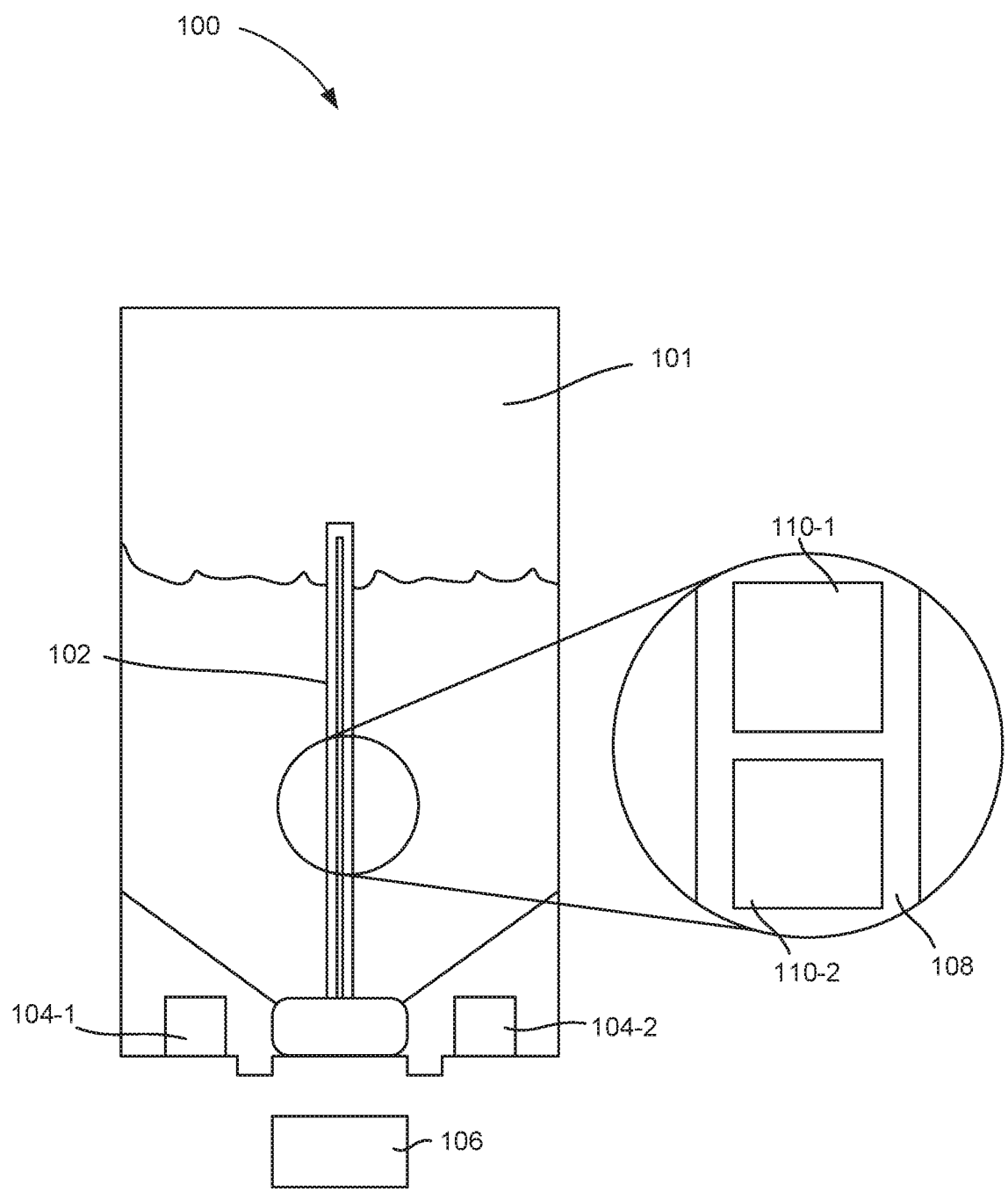
FIG. 1 is a cross-sectional view of a fluid reservoir having a fluid level sensing device disposed therein, according to an example of the principles described herein.

Fluid reservoirs are used to hold various types of fluids. For example, in a printing system, an ink cartridge stores a volume of ink. This ink is passed to a printhead for ultimate deposition on a media to form text or images on the media.

As printing fluid is deposited on media, the fluid reservoir is depleted of printing fluid. Attempting to execute a printing operation when a fluid reservoir is empty can result in damage to the printing device, the printhead, or the reservoir itself. Moreover, print quality can suffer if printing is executed with a reduced amount of fluid in the reservoir. Still further, it may be inconvenient to a consumer if a fluid reservoir runs out and the consumer has not been able to adequately prepare, for example by purchasing additional fluid reservoirs. Such consumer inconvenience can lead to customer dissatisfaction and ultimate loss of profits by a manufacturer of the reservoir.

Accordingly, fluid level sensing devices can be used to detect the amount of fluid in a fluid reservoir. Knowing the level of fluid in the fluid reservoir is helpful in providing accurate information regarding fluid levels. In the case of a printing system, such sensors can be used to estimate how much printing can be performed given the present level of ink in an ink reservoir. While such fluid level sensing devices can be helpful in indicating an amount of fluid, some characteristics reduce the sensing devices ability to accurately indicate a fluid level.

For example, certain circumstances may lead to falsely high fluid level measurements. As a specific example, an individual sensor that falls along the sensing die may at one point in time indicate no fluid is present at that particular location. At some subsequent point in time, a random fluid drop, or a meniscus of the fluid in the reservoir may cover that particular sensor which would then indicate fluid at that particular location, even though the main body of fluid is below that particular sensor. In another example, user manipulation, i.e., removal and agitation of the reservoir could also lead to fluid covering a particular sensor, even though the corpus of the fluid is below that particular sensor. In these and other cases, a fluid level indication may be erroneously high, meaning it indicates more fluid is in the reservoir than is actually present in the reservoir. Such an erroneous indication could lead to user dissatisfaction as well as other complications. For example, if an ink level reading is falsely high, the corresponding printing device may continue to operate with less fluid than is indicated. If the actual ink level is too low, this could damage the printing device.

Accordingly, the present specification describes a fluid level sensing device that addresses these and other complications. Specifically, the present specification describes a device and method wherein once a particular fluid level sensor indicates there is no fluid at that particular location, it is prevented from subsequently indicating there is fluid at that location. More specifically, the device is "locked-in" to a "no fluid" state for subsequent readings. Doing so prevents inaccurate fluid level readings due to random fluid drops, meniscuses, agitation of the reservoir and other scenarios that could lead to a falsely high fluid level reading. Also, locking in a write-once memory to a no fluid state reduces the time for subsequent fluid level measurement cycles as a quickened analysis of sensors that are in a no fluid state is provided. This specific disclosure provides for a manual locking-in of a memory device to the no fluid state. In other words, the locking in of the write-once memory is performed based on a write command issued from a controller.

Specifically, the present specification describes a fluid level sensing device. The fluid level sensing device includes a sensing die having a number of fluid level sensors disposed thereon. A number of control devices correspond to, and control, the number of fluid level sensors. A control device includes a comparing device to determine a state of a corresponding fluid level sensor. The state of the fluid level sensor is selected from the group consisting of a fluid state and a no fluid state. The control device also includes a non-volatile memory device to indicate whether the corresponding fluid level sensor is at the fluid state or the no fluid state. The control device also includes a locking device to 1) receive a write command to set a state of the non-volatile memory device to the no fluid state and 2) irreversibly set the non-volatile memory device to the no fluid state based on the write command from a controller.

The present specification also describes a method for controlling a fluid level sensor. According to the method, a state of the fluid level sensor is determined. The state is selected from the group consisting of a fluid state and a no fluid state. Information indicative of the state of the fluid level sensor is passed to a controller. When the fluid level sensor is in a no fluid state, a non-volatile memory device corresponding to the fluid level sensor is irreversibly set to indicate that the fluid level sensor is in the no fluid state based on a write command from the controller.

The present specification also describes a fluid reservoir. The reservoir includes a chamber to hold a volume of the fluid. A fluid level sensing device is disposed within the chamber. The fluid level sensing device includes a sensing die to extend into the chamber and multiple fluid level sensors disposed on the sensing die. Each of the multiple fluid level sensors is positioned at a different depth within the chamber. The device also includes multiple control devices disposed on the sensing die. Each of the control devices corresponds to one of the fluid level sensors. A control device includes a comparing device to determine a state of a corresponding fluid level sensor. The state of the fluid level sensor is selected from the group consisting of a fluid state and a no fluid state. A control device also includes a non-volatile memory device to indicate whether the corresponding fluid level sensor is at the fluid state or the no fluid state. The control devices also include a locking device to receive a write command to set a state of the non-volatile memory device to a no fluid state and to irreversibly set the non-volatile memory device to the no fluid state based on the write command from a controller.

Using such a fluid level sensing device level 1) provides a low cost, high volume, and simple manufacturing process; 2) quickens the fluid level detection cycle; 3) locks in a no fluid state independent of a write signal from a controller; 4) indicates accurate fluid level and is robust against agitation of the reservoir, random fluid drops, and meniscuses that may be present in the container; 5) supports multiple processes for detecting fluid levels; and 6) results in increased customer satisfaction due to the increased performance. However, it is contemplated that the devices disclosed herein may provide useful in addressing other matters and deficiencies in a number of technical areas. Therefore, the systems and methods disclosed herein should not be construed as addressing any of the particular matters.

As used in the present specification and in the appended claims, the term "state" indicates whether or not a particular fluid level sensor indicates fluid is present at the corresponding location. For example, a fluid level sensor in a "no fluid" state indicates that fluid is not covering a particular sensor and a "fluid" state indicates that fluid is covering the particular sensor. Similar to the fluid level sensor, a non-volatile memory device may also be in a "fluid" or "no fluid" state.

Further, as used in the present specification and in the appended claims, the term "based on a write command" indicates that the non-volatile memory is locked in after receiving a separate write command from the controller.

Still further, as used in the present specification and in the appended claims, the term "write-once" memory refers to memory that may be written one time from its initial state. For example, the memory may initially be set to a first state represented as a logic value of 0. A write-once memory may be changed one time to a different state, for example corresponding to a logic value 1, and subsequent write attempts cannot change the value again.

Even further, as used in the present specification and in the appended claims, the term "fluid level" refers to a liquid level in a reservoir that is otherwise filled with air.

Yet further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Turning now to the figures, FIG. 1 is a cross-sectional view of a fluid reservoir (100) having a fluid level sensing device (102) disposed therein, according to one example of the principles described herein. A fluid reservoir (100) may be any container that holds a fluid. For example, a printing system implements a print cartridge, wherein the fluid stored therein is ink or another printable fluid. The fluid reservoir (100) retains the fluid and supplies it to a system for further operation. For example, in a printing system, via a number of fluid interconnects (104), a printing fluid within the chamber (101) is supplied to a printhead to be ultimately deposited on media. As fluid is used, it is depleted from the fluid reservoir (100). Accordingly, a fluid level sensing device (102) allows for an accurate indication of the fluid level within the fluid reservoir (100). Moreover, the fluid level sensing device (102) of the present specification includes control devices to protect against erroneous fluid level indications. Thus, the fluid level sensing device (102) of the present specification provides even more accurate fluid level indications and a quickened fluid level determination.

The fluid level sensing device (102) includes a sensing die (108) that has a number of fluid level sensors (110) disposed thereon, which fluid level sensors (110) detect a fluid level. As can be seen in FIG. 1, the sensing die (108) extends into a volume of the chamber (101) containing the fluid. The sensing die (108) supports the fluid level sensors (110) that extend along a length of the sensing die (108). The sensing die (108) can support various types of fluid level sensors (110) that may be implemented on the fluid level sensing device (102).

For example, pairs of heaters and heat sensors may be used. In this example, each of the heat sensors is sufficiently close to a corresponding heater such that the heat sensor may detect or respond to the transfer of heat from the associated or corresponding heater. Each of the heat sensors outputs a signal which indicates or reflects the amount of heat transmitted to the particular heat sensor following, and corresponding to, a pulse of heat from the associated heater. The amount of heat transmitted to the associated heat sensor will vary depending upon the medium through which the heat was transmitted prior to reaching the heat sensor. For example, fluid has higher heat capacity than air so it will decrease the temperature detected by a heat sensor. In other words, if the level of fluid within the chamber (101) is such that fluid that surrounds a particular heater and its associated heat sensor, heat transfer from the particular heater to the associated heat sensor will be less as compared to circumstances where air surrounds the particular heater and its associated heat sensor.

Based on the amount of heat sensed by the associated heat sensor following the emission of the heat pulse by the associated heater, the controller determines whether air or liquid surrounds the particular heater and the associated heat sensor. Using this determination and the known location of the heater and/or heat sensor along the sensing die (108) and the relative positioning of the sensing die (108) with respect to the floor of the chamber (101), the controller determines the level of fluid within the chamber (101). Based upon the determined level of fluid within the chamber (101) and the characteristics of the chamber (101), the controller is further able to determine the actual volume or amount of fluid remaining within the chamber (101).

Another example of a type of fluid level sensor (110) is an impedance level sensor (110) which detects the capacitance of a fluid that surrounds the fluid level sensor (110). As fluid conducts electricity at a different rate then air, the conductivity between fluid level sensors (110) can be used to determine whether the conducting medium is air or fluid. Yet another example is an optical sensor, wherein photodiodes distributed along the sensing die (108) are paired with a single, or multiple light emitting elements. If light is collected at a particular diode, it indicates that fluid is not present at that level. While specific reference is made to a few particular types of fluid level sensors (110), varying types of fluid level sensors (110) may be used in accordance with the fluid level sensing device (102) of the present specification.

For simplicity, in FIG. 1, a few fluid level sensors (110-1, 110-2) are depicted, but the fluid level sensors (110-1, 110-2) may extend along a length of the sensing die (108). Note also that the fluid level sensors (110-1, 110-2), as depicted in at least FIG. 1 are not to scale and are enlarged to show their presence on the sensing die (108).

As depicted in FIG. 1, the fluid level sensing device (102) is disposed within the chamber (101). As will be described below, the fluid level sensing device (102) has electrical interconnects to output data collected from the number of sensors (110). These electrical interconnects of the fluid level sensing device (102) mate, and electrically couple, with a corresponding electrical interconnect (106) on a separate component such that data collected from the fluid level sensing device (102) can be passed to a corresponding system and analyzed and used to control operation of the associated system.

Figure 2:
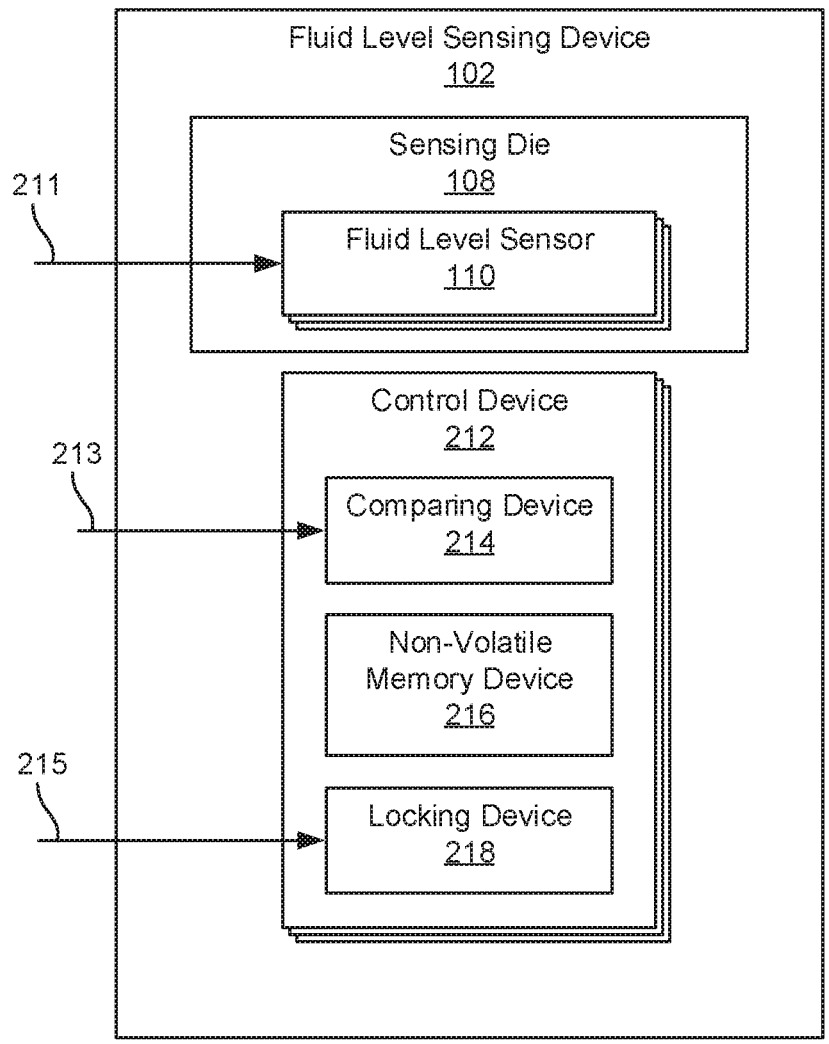
FIG. 2 is a block diagram of the fluid level sensing device, according to an example of the principles described herein.

FIG. 2 is a block diagram of the fluid level sensing device (102), according to an example of the principles described herein. As described above, the fluid level sensing device (102) has a sensing die (108) with a number of fluid level sensors (110) disposed thereon. The sensing die (108) is a rigid member that provides mechanical support for the fluid level sensors (110). The sensing die (108) may be formed of any number of materials including plastic, silicon, glass polymers, FR4, glass-reinforced epoxy laminate sheet, tub, rod, or printed circuit board, or other rigid member. In one example, the sensing die (108) includes a composite material of woven fiberglass cloth with an epoxy resin binder. In one example, the sensing die (108) is a printed circuit board having embedded electrical traces and contact pads to facilitate electrical connection between various components mounted on the sensing die (108).

The sensing die (108) extends into the chamber (FIG. 1, 101) that contains the fluid. The fluid level sensors (110) may extend along a length of the sensing die (108) and accordingly correspond to different depths within the chamber (FIG. 1, 101) in which they are disposed. The fluid level sensors (110) may be of varying type and are used to detect a level of fluid within the chamber (FIG. 1, 101). For example, if a first fluid level sensor (110) detects fluid at a first level and an immediately adjacent fluid level sensor (110), for example one that is at a higher position than the first fluid level sensor (110), detects no fluid then a determination can be made that the level of fluid within the chamber (FIG. 1, 101) is somewhere between those two sensors. The fluid level sensors (110) may be placed relatively close to one another. For example, there may be at least 100 fluid level sensors (110) per inch along the sensing die (108). With such a resolution, accurate detection of fluid levels within a chamber (FIG. 1, 101) is attainable.

These fluid level sensors (110) then pass that data to be output to an external device that can use the data. For example, the fluid level data gathered from the fluid level sensors (110) can be passed to the user to indicate to the user when the fluid reservoir (FIG. 1, 100) is to be refilled or replaced. Still further, the data collected could be used by a printing system to prevent the printing system from depositing ink on a print media when the fluid level sensors (110) indicate that the fluid level in the fluid reservoir (FIG. 1, 100) is below a threshold level.

The fluid level sensing device (102) also includes a number of control devices (212). The control devices (212) correspond to the fluid level sensors (110). For example, a fluid level sensing device (102) that has 100 fluid level sensors (110), also has 100 control devices (212). In some examples, the control device (212), which may include hardware and other circuitry, may be disposed on the sensing die (108). In other examples, the control devices (212) may be disposed on another substrate. The control devices (212) include components and other devices that assist in the detection of fluid at a particular sensor and other controlling operations. For example, the number of control devices (212) may assist in the locking in of a non-volatile memory device (216) of the system to a no fluid state.

Specifically, the control device (212) includes a comparing device (214) that determines a state of a corresponding fluid level sensor (110). More specifically, a fluid level sensor (110) may have at least two states: a fluid state wherein the fluid level sensor (110) indicates fluid at a particular location along the sensing die (108) and a no fluid state wherein the fluid level sensor (110) indicates that fluid is not found at that particular location along the sensing die (108). The comparing device (212) therefore includes hardware and circuitry to determine which of these states a corresponding fluid level sensor (110) is in. The comparing device (214) may initiate an operation wherein the non-volatile memory device (216) state is irreversibly set to indicate that fluid is not present at a location identified by the corresponding fluid level sensor (110). A specific example of a comparing device (214), and the control device (212) in general, is provided below in connection with FIGS. 5A and 5B.

The control device (212) also includes a non-volatile memory device (216). A non-volatile memory refers to hardware and circuitry that can store information even after having been power cycled. In other words, the non-volatile memory device (216) is not dependent upon electrical power to store information. The non-volatile memory device (216) can also have multiple states. For example, corresponding to the fluid level sensor (110), a non-volatile memory device (216) may be in a "fluid" state when it indicates that the corresponding fluid level sensor (110) is also in a fluid state. Similarly, a non-volatile memory device (216) may be in a no fluid state when it indicates that the corresponding fluid level sensor (110) is in a no fluid state.

The non-volatile memory device (216) may be a write-once memory device, meaning that from its initial state, the non-volatile memory device (216) may be changed one time and subsequent attempts to change the write-once memory device are prevented. In using, a write-once non-volatile memory device (216) errant fluid level readings can be prevented. For example, in an initial state a non-volatile memory device (216) may be in a "fluid" state indicating that a corresponding fluid level sensor (110) is in the presence of fluid in the reservoir (FIG. 1, 100). As a fluid level drops, and a fluid level sensor (110) changes from a fluid state to a no fluid state, the corresponding non-volatile memory device (216) state is accordingly updated. A write-once memory device prevents subsequent changing of state of the memory device, i.e., from a no fluid state back to a fluid state. Accordingly, with a write-once non-volatile memory device (216) any subsequent attempts to determine fluid level from the non-volatile memory device (216) will return a no fluid state. A specific example of a non-volatile memory device (216), and specifically of a write-once non-volatile memory device (216), is provided below in connection with FIGS. 5A and 5B. Using such a write-once non-volatile memory device (216) prevents inadvertent mis-readings and malicious attempts to circumvent acceptable fluid level measurement.

The control device (212) also includes a locking device (218) to irreversibly set the non-volatile memory device (216) to the no fluid state based on a write command from an external controller. For example, the locking device (218) receives a write command to set the state of the non-volatile memory device (216) to a no fluid state and based on this command irreversibly sets the non-volatile memory device (216) to the desired state. In some examples, the write command may be received from the controller based on a particular signal sent to the controller. For example, the control device (212) may indicate that the corresponding fluid level sensor (110) is in a no fluid state. Responsive to such an indication, a controller may send a write signal. By comparison, if the control device (212) indicates that the corresponding fluid level sensor (110) is in a fluid state, no such write command is triggered.

The locking device (218) may be any component that can write the non-volatile memory device (216) to a new state permanently. Of particular relevance, the locking device (218) may do so based on a write command. By performing locking based on a write command, a verification of the fluid state can be performed as described below.

The fluid level sensing device (102) depicted in FIG. 2 receives various signals from a controller. For example, a select signal (211) is used to select a particular fluid level sensor (110) for evaluation. A threshold signal (213) is received which is used to compare against information retrieved from the fluid level sensor (110) to determine whether the corresponding fluid level sensor (110) is in a no fluid state. A write command (215) is received, in some cases based off the results of the comparing device (214). The write command (215) instructs the locking device (218) to perform a locking in operation. Each of these signals may be distinct from one another. In other words, the control device (212) may receive three different types of signals.

The present fluid level sensing device (102) therefore allows for a "locking in" of a state for a non-volatile memory device (216). Accordingly, any subsequent reads of this non-volatile memory device (216) data will return a no fluid state. Doing so prevents erroneously high fluid level measurements and also increasingly reduces the amount of time to determine fluid level. More specifically, sequential fluid level sensors (110) returns a "no fluid state on account of fluid continually dropping within the reservoir (FIG. 1, 100), an iteratively smaller subset of fluid level sensors (110) will be tested.

Figure 3:
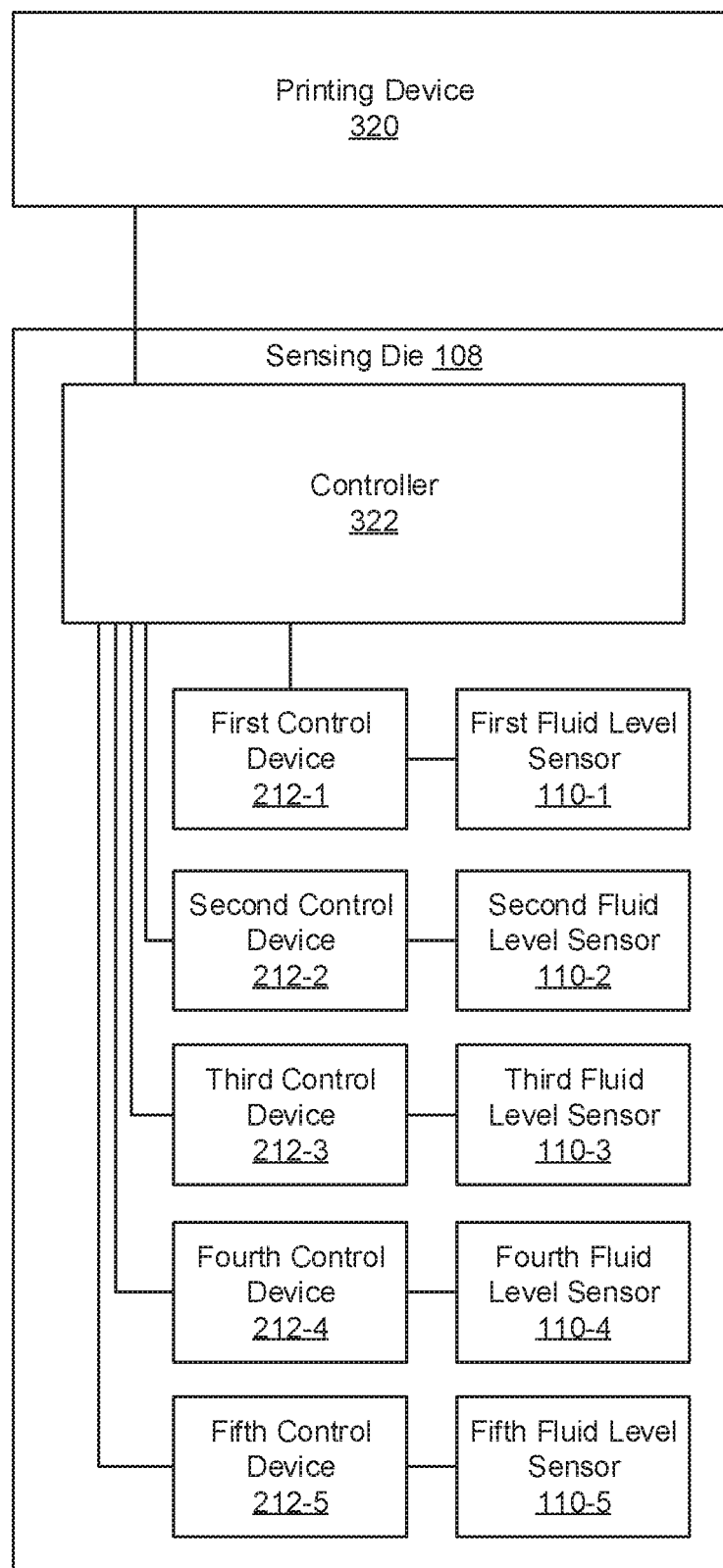
FIG. 3 is a diagram of a system for implementing the fluid level sensing device, according to an example of the principles descried herein.

FIG. 3 is a diagram of a system for implementing the fluid level sensing device (FIG. 1, 102), according to an example of the principles described herein. As described above, the fluid level sensing device (FIG. 1, 102) includes a sensing die (108) having a number of fluid level sensors (110) disposed thereon and a corresponding number of control devices (212). While FIG. 3 depicts five sensor/control device pairs, any number of sensor/control device pairs may be implemented in accordance with the principles described herein.

In some examples, the fluid level sensing device (FIG. 1, 102) also includes a controller (322), The controller (322) is coupled to the various control devices (212) as well as to a separate device such as a printing device (320). Note that the connecting lines depicted in FIG. 3 do not indicate a number of physical connections, but rather a logical connection between components. In other words, while a single line is present between the controller (322) and the first control device (212-1), any number of signals may be passed between the two. For example, the controller (322) may, on one channel, send a select signal to the first control device (212-1) instructing the first control device (212-to return a fluid level for the corresponding first fluid level sensor (110-1). That same first control device (212-1) may return data indicating the state of the first fluid level sensor (110-1) back to the controller (322) on a different channel. In yet another example, the controller (322) may send a write command to a control device (212) which write command prompts the control device (212) to lock in the corresponding non-volatile memory device (FIG. 2, 216) to a no fluid state.

In the system depicted in FIG. 3, a printing device (320), or any other such device that cooperates with a reservoir (FIG. 1, 100) that holds fluid, can instruct the controller (322) to perform a fluid level measurement operation. In some examples, the signal from the printing device (320) can select a particular sensor (110). In other examples, the signal from the printing device (320) generally initiates a fluid level determination, and the controller (322) sequentially selects particular sensors (110) to evaluate.

The controller (322) sends a signal to select the corresponding control device (212) and the corresponding control device (212) initiates a process to determine whether the corresponding fluid level sensor (110) is in a fluid state or a no fluid state. Regardless of the state, this value is then passed back to the printing device (320) via the controller (322). If the returned state happens to be a no fluid state, the controller (322) may choose to send a write command to the control device (212). This write command prompts the control device (212) to initiate an operation to permanently lock in the non-volatile memory device (FIG. 2, 216) to a no fluid state. Separating the write command from the detection of a fluid level sensor (110) state affords greater flexibility in locking-in a non-volatile memory device (FIG. 2, 216). For example, other factors or system characteristics may be considered before locking in the state of the non-volatile memory device (FIG. 2, 216).

Still further, a sensing operation could be performed independent of a write operation. For example, after a first fluid level sensor (110-1) is sensed as being in no fluid state, and the corresponding non-volatile memory device (FIG. 2, 216) irreversibly set to so indicate, a subsequent sensing operation could be performed on the first fluid level sensor (110), without involving the corresponding non-volatile memory device (FIG. 2, 216). Such a subsequent sensing, when performed in conjunction with a reading of the corresponding non-volatile memory device (FIG. 2, 216) can be used to determine whether there are any discrepancies between a sensor (110) state and its corresponding non-volatile memory device (FIG. 2, 216) state.

Any subsequent requests from the printing device (320) to select and test that particular fluid level sensor (110) can be bypassed, and a return result of no fluid will be returned. In some examples, the controller (322) sequentially selects a fluid level sensor (110) to be tested. More specifically, the controller (322) may start with a highest elevation sensor, i.e., the first fluid level sensor (110-1) and sequentially test the remaining sensors (110) until an indication of a sensor (110) in a fluid state is returned.

The controller (322) also provides a threshold value to facilitate detecting whether the corresponding fluid level sensor (110) is in a fluid state or a no fluid state. For example, output from a fluid level sensor (110) may be in the form of a voltage, where a low voltage indicates fluid is present. The controller (322) can pass to the control device (212) a threshold voltage. If the voltage from the fluid level sensor (110) is less than the threshold voltage, then it is determined that the corresponding fluid level sensor (110) is in a fluid state, i.e., fluid is present at the fluid level sensor (110). By comparison, if the voltage from the fluid level sensor (110) is greater than the threshold voltage, then it is determined that the corresponding fluid level sensor (110) is in a no fluid state, i.e., fluid is not present at the fluid level sensor (110).

The controller (320) also provides the write command by which the non-volatile memory device (FIG. 2, 216) is locked in, Such a write command is generated responsive to the state of the fluid level sensor (110). More specifically, if the fluid level sensor (110) is in a fluid state, no such write command is generated, but if the fluid level sensor (110) is in a no fluid state the write command may be generated and passed to the corresponding control device (212).

Figure 4:
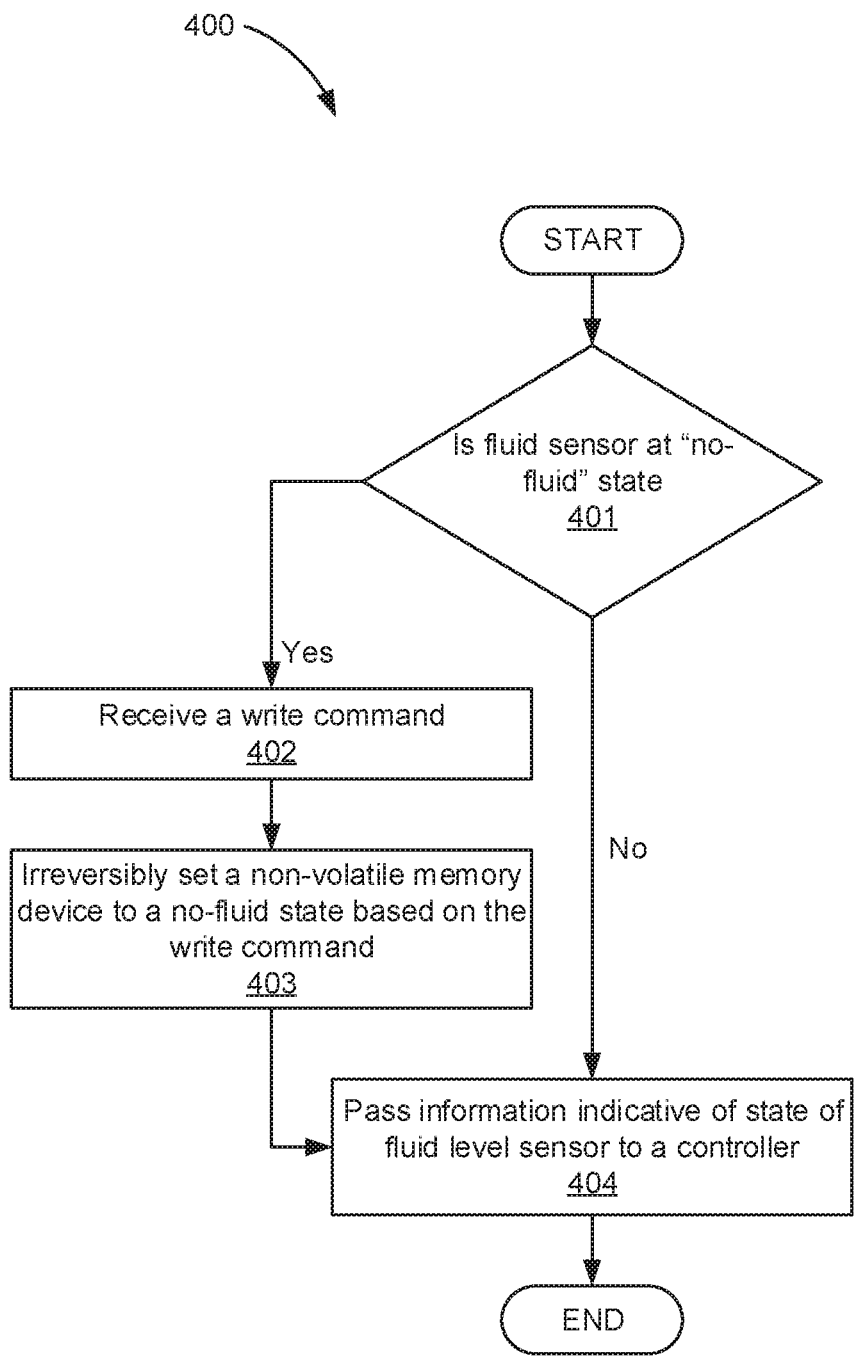
FIG. 4 is flowchart illustrating a method for controlling a fluid level sensing device, according to an example of the principles described herein.

FIG. 4 is a flowchart illustrating a method (400) for controlling a fluid level sensing device (FIG. 1, 102), according to an example of the principles described herein. According to the method (400), it is determined (block 401) whether a fluid level sensor (FIG. 1, 110) is in a no fluid state or a fluid state. This may be done for example, by receiving information from the corresponding fluid level sensor (FIG. 1, 110) and comparing it to a threshold value. More specifically, the information received form the fluid level sensor (FIG. 1, 110) may be a voltage value that when compared against a threshold voltage indicates whether or not the corresponding fluid level sensor (FIG. 1, 110) is in a no fluid state or a fluid state.

If the fluid level sensor (FIG. 1, 110) is in a fluid state (block 401, determination NO), information indicative of the state of the fluid level sensor (FIG. 1, 110) is passed (block 404) to the controller (FIG. 3, 322). Such information may be a voltage value that corresponds to a logic value. In one particular example, no voltage being passed to the controller (FIG. 3, 322) indicates that the state of the fluid level sensor (FIG. 1, 110) is a fluid state.

If the fluid level sensor (FIG. 1, 110) is in a no fluid state (block 401, determination YES), the controller (FIG. 3, 320) sends, and the control device (FIG. 2, 212) receives (block 402) a write command. The write command may be a voltage that when acted upon by the control circuit (FIG. 2, 212) changes a state of a corresponding non-volatile memory device (FIG. 2, 216).

Based on the write command, the controller (FIG. 2, 212) irreversibly sets (block 403) the state of the non-volatile memory device (Fig, 2, 216) to a no fluid state. In other words, during operation, a write command is received that is independent of a select signal and a threshold value, which write command initiates a "locking in" of the non-volatile memory device (FIG. 2, 216). As will be described in an example, the locking in of the non-volatile memory device (FIG. 2, 216) occurs when both a write signal and the separately sent select signal are passed to the corresponding control device (FIG. 2, 212). The write command may be sent and received, responsive to passing information that the fluid level sensor (FIG. 1, 110) is in a no fluid state. Note as indicated in FIG. 4, that if the fluid level sensor (FIG. 1, 110) is in a fluid state, then no such write command is received.

Locking in the non-volatile memory device (FIG. 2, 216) after a write command is received allows for a more hands-on approach to fluid level detection. For example, rather than automatically locking in the state of the non-volatile memory device (FIG. 2, 216) without any further interaction, i.e., command signals, from a controller (FIG. 3, 320), additional data could be used to determine when to lock in the no fluid state of the non-volatile memory device (FIG. 2, 216).

Using the method (600), wherein the irreversible setting (block 403) of the non-volatile memory device (FIG. 2, 216) is performed responsive to a received write command facilitates verification of the status of the non-volatile memory device (FIG. 2, 216). For example, the printing device (FIG. 3, 320) may want to double check the reading, either immediately or at some time later, before choosing to irreversibly set the non-volatile memory device (FIG. 2, 216). In other words, the output of the comparing device (FIG. 2, 214) is not affected by the state of the non-volatile memory device (Fig., 2, 216). This allows a printing device (FIG. 3, 320) or other controlling system to re-read the state of any fluid level sensor (FIG. 1, 110) regardless of whether the non-volatile memory device (FIG. 2, 216) has been irreversibly set.

Still further, using the method (600), wherein the irreversible setting (block 403) of the non-volatile memory device (FIG. 2, 216) is performed responsive to a received write command allows for a printing device (FIG. 3, 320) or other controlling system to consider additional information before locking in the non-volatile memory device (FIG. 2, 216). Doing so can prevent false positive results. A specific example of how the non-volatile memory device (FIG. 2, 216) is irreversibly set (block 403) to a no fluid state independent is provided in connection with FIG. 5.

Figure 5A:
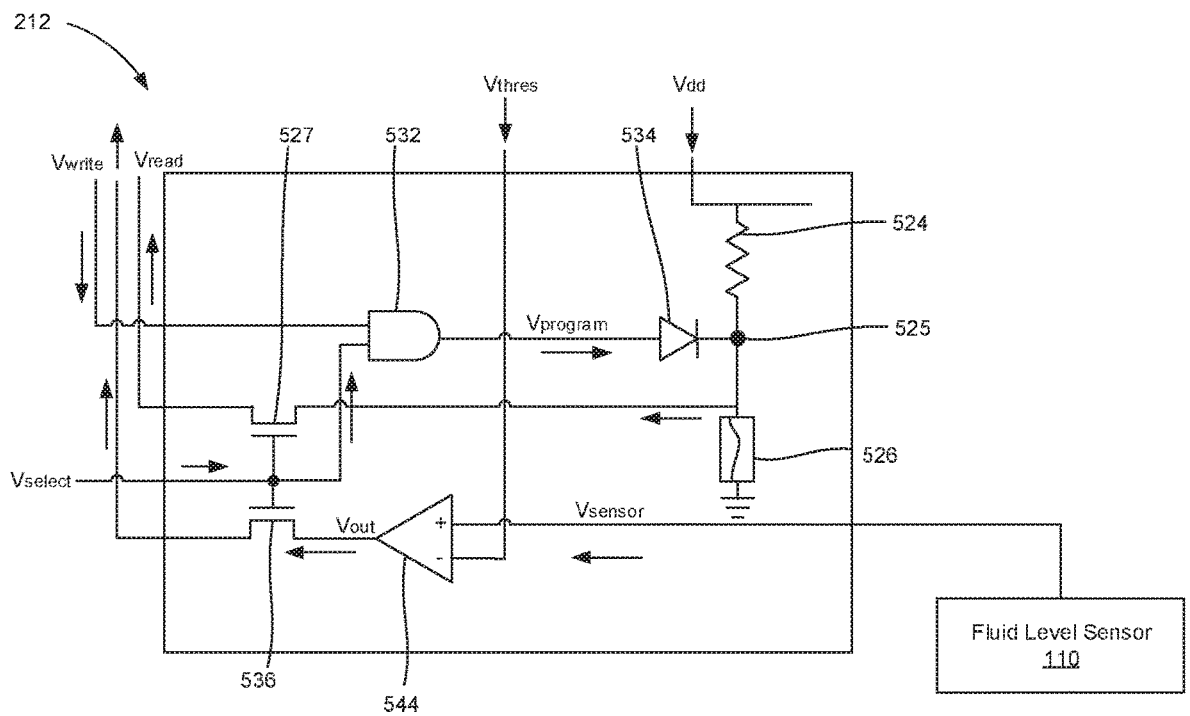
FIGS. 5A and 5B are examples of a control device of a fluid level sensing device, according to examples of the principles described herein.
Figure 5B:
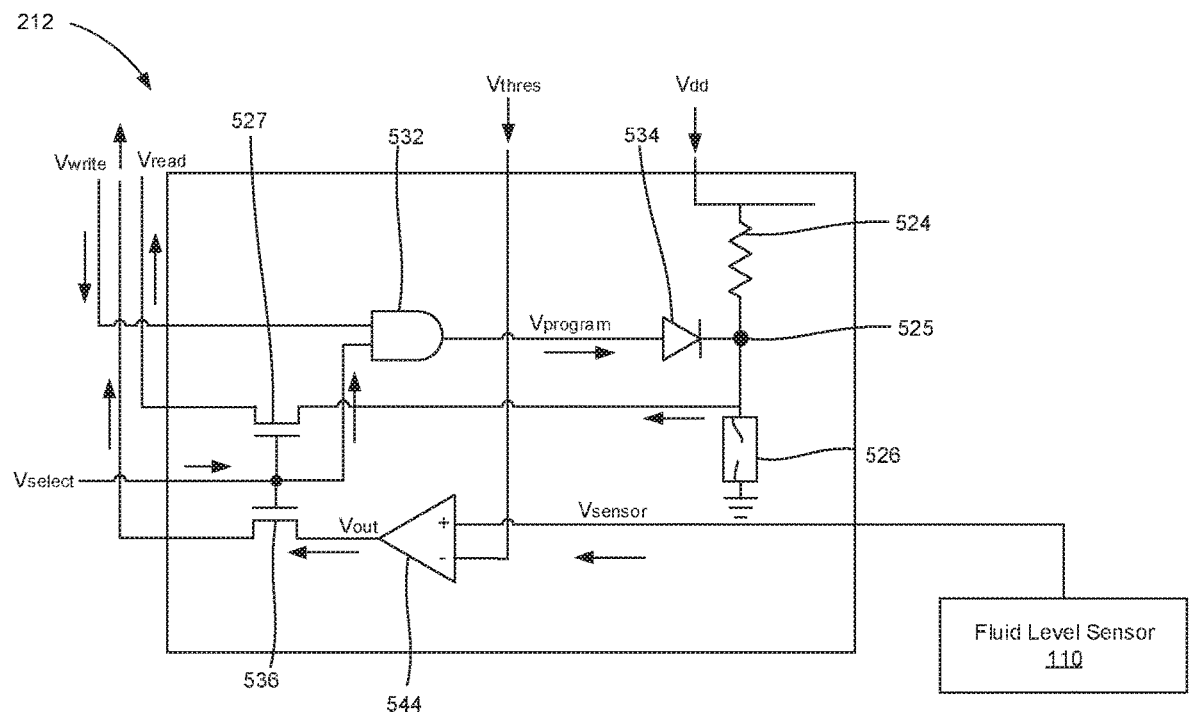

FIGS. 5A and 5B are examples of control devices (212) of a fluid level sensing device (FIG. 1, 102), according to examples of the principles described herein. Specifically, FIG. 5A depicts the control device (212), and data transfer, when the fluid level sensor (110) indicates it is in a fluid state and FIG. 5B depicts the control device (212), and data transfer, when the fluid level sensor (110) indicates that it is in a no fluid state. As depicted in FIGS. 5A and 5B, the non-volatile memory device (FIG. 2, 216) may include at least a resistive device (524) and a fuse (526). The locking device includes at least a sensing transistor (536), a logic AND device (532), and a diode (534). In FIGS. 5A and 5B, the various arrows indicate the flow of current through the circuit. Also in FIGS. 5A and 5B, a low voltage may be represented by a logic 0 and a high voltage may be represented by a logic 1.

In the example depicted in FIG. 5A, the fluid level sensor (110) may be in a fluid state. Accordingly, $V_{sensor}$ passing out of the fluid level sensor (110) will be a lower voltage than a voltage passed when fluid is not present. At the same time, the controller (FIG. 3, 320) supplies the comparator (544) of the control device (FIG. 2, 212) with a threshold voltage, $V_{thres}$. $V_{thres}$ may be set such that it is greater than $V_{sensor}$ when $V_{sensor}$ is indicating fluid at the corresponding fluid level sensor (110), i.e., a lower value of $V_{sensor}$. As the positive terminal of the comparator (544) is a lower value than the negative terminal, an output of the comparator (544), $V_{out}$ will also be a low voltage, i.e., logic 0.

As described above, a determination of state of the fluid level sensor (110) and passing of such information to the controller (FIG. 3, 320) is responsive to the corresponding control device (212) being selected. Accordingly, the controller (FIG. 3, 320) may pass a select signal, $V_{select}$, which may be a high voltage, i.e., logic 1. The select signal, $V_{select}$, closes the select transistor (536) such that the output, $V_{out}$, of the comparator (544) can be passed to the controller (FIG. 3, 320). Accordingly, a low voltage output $V_{out}$ from the comparator (544) is passed to the controller (FIG. 3, 320) thus indicating the fluid state of the fluid level sensor (110).

In the control device (212) depicted in FIGS. 5A and 5B there are two ways to obtain state information from the control device (212). The first is via the output of the comparator (544) as described above. The second is via the fuse (526) and other components that make up the non-volatile memory device (FIG. 2, 216) as will be described below. So doing allows for verification of the non-volatile memory device (FIG. 2, 216). For example, if there is a distinction between the output of the comparator (544) and the output of the memory node (525), it could indicate a problem within the system. In other words, the dual-mode identification of fluid level sensor (110) state provided by the control device (212) could increase the information available to evaluate fluid levels or to identify other characteristics of the control device (212) operation.

In the second method, the control circuit (212) of FIG. 5A can be used to determine a state of the non-volatile memory device (FIG. 2, 216) by passing a $V_{write}$ signal and a $V_{select}$ signal to the logic AND device (532). The AND device (532) is a component that performs a digital function of two input signals. If both inputs are 1, the output is 1. If either one or both inputs are 0, the output is 0. Therefore, $V_{program}$ will always be 0 and the fuse will not blow unless $V_{write}$ and $V_{select}$ are high simultaneously.

The select signal, $V_{select}$, also closes a read transistor (527) that passes the value of the memory node (525) to the $V_{read}$ line, and onto the printer. During a read operation, the value $V_{write}$ may be low, i.e., logic 0. Given that during reading, the $V_{select}$ is high and $V_{write}$ is low, the output of the logic AND device (532), $V_{program}$, will also be low.

The diode (534) of the circuit prevents the memory node (525) from being pulled low by the logic AND device (532) once the fuse (526) is blown. In other words, the diode (534) prevents a fight from occurring between the pull-up resistor (524) and the logic AND device (532) when the logic AND device (532) is driving a logic 0. The non-volatile memory device (FIG. 2, 216) includes a fuse (526). The $V_{program}$ based on the "AND"ing of $V_{select}$ and a low $V_{write}$ is a logic 0, and does not blow the fuse (526). When intact, the fuse (526) pulls the memory node (525) down. In this example, the resistive device (524) and fuse (526) form a resistor divider such that the voltage at the memory node (525) is a function of the resistance ratios. The fuse (526) resistance is designed to be lower than the resistive device (524) such that the voltage at the memory node (525) is considered logic 0 when the fuse (526) is intact. When the fuse (526) is blown, the voltage at the memory node (525) becomes much higher, and is interpreted as a logic 1 when read. Thus, when the fluid level sensor (110) is in a fluid state the output of the comparator (544), $V_{out}$ will be low and this will be passed to the controller (FIG. 3, 320) to indicate that the fluid level sensor (110) is in a fluid state.

In the example depicted in FIG. 5B, the fluid level sensor (110) is in a no fluid state. As the fluid level sensor (110) is in a no fluid state, $V_{sensor}$ passing out of the fluid level sensor (110) will be higher than a voltage passed when fluid is present. At the same time, the controller (FIG. 3, 320) supplies the comparator (544) of the control device (FIG. 2, 212) with a threshold voltage, $V_{thres}$. As described above, $V_{thres}$ may be set such that it is less than $V_{sensor}$ when $V_{sensor}$ is indicating no fluid is at the corresponding fluid level sensor (110). As the positive terminal of the comparator (544) is a greater value than the negative terminal, an output of the comparator (544), $V_{out}$ will also be a high voltage, i.e., logic 1.

As in FIG. 5A, $V_{select}$ closes the sensing transistor (536) such that the output $V_{out}$ of the comparator (544) can be passed to the controller (FIG. 3, 320). Accordingly, a high voltage output $V_{out}$ from the comparator (544) is passed to the controller (FIG. 3, 322) thus indicating the no fluid state of the fluid level sensor (110).

The sending of a high $V_{out}$ may instigate a write command which initiates a permanent locking in of the non-volatile memory device (FIG. 2, 216). Specifically, if a high $V_{out}$ is received, the printing device (FIG. 3, 320) may elect to write the non-volatile memory device (FIG. 2, 216) to indicate that the fluid level sensor (110) is in a no fluid state. Accordingly, a high voltage $V_{write}$, i.e., logic 1, is passed to the logic "AND" device (532). As $V_{write}$ is high i.e., logic 1, and $V_{select}$ is high, i.e. logic 1, $V_{program}$ is also high, i.e., logic 1. In other words, the fuse (526) may be configured such that a $V_{program}$ based on the logical "AND"ing of $V_{select}$ and a high $V_{write}$ burns out the fuse (526). Thus, the memory node (525) is pulled high as the fuse (526) is burnt out. In this example with a blown fuse (526), $V_{program}$ is raised to $V_{dd}$ resulting in a high value passed to the controller (FIG. 3, 322). In other words, using the circuit described herein, once a fluid level sensor (110) indicates a no fluid state, it will forever yield a no fluid state. Thus the specific circuit described in FIGS. 5A and 5B allows for an irreversible setting of a non-volatile memory device (FIG. 2, 216) to a no fluid state thus preventing inadvertent or intentional interference with proper fluid level sensing.

In the example depicted in FIGS. 5A and 5b subsequent reads of the non-volatile memory device (FIG. 2, 216) state are not precluded. For example, the printing device (FIG. 3, 320) may have the option of reading the memory as described above according to the second read operation, but can also read the fluid sensor (110) state according to the first read operation and verify that the state indicated by the memory node (525) is the same as the state indicated at the output of the comparator (544). Doing so may be helpful if other information indicates an anomaly. In other words, the dual-mode state determination provides additional information that could be useful in evaluating the system.

While FIGS. 5A and 5B depict one particular configuration of circuitry making up the control device (212), other configurations, and circuitry elements could be used to carry out the comparison, storage, and locking in functions.

Figure 6:
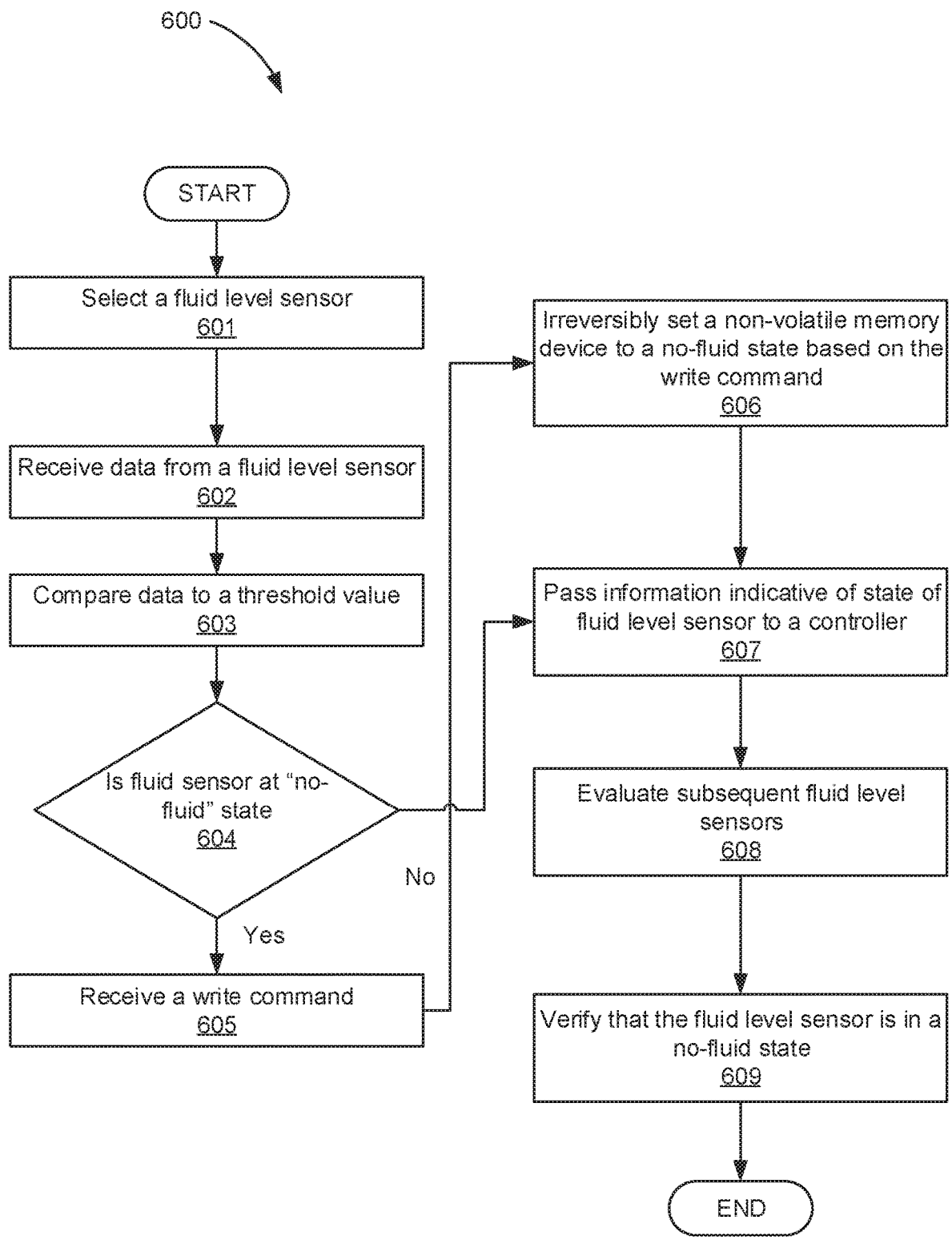
FIG. 6 is a flowchart illustrating a method for controlling a fluid level sensing device, according to an example of the principles described herein.

FIG. 6 is a flowchart illustrating a method (600) for controlling a fluid level sensing device (FIG. 1, 102), according to an example of the principles described herein. According to the method (600) a fluid level sensor (FIG. 110) to be evaluated is selected (block 601) from a number of fluid level sensors (FIG. 1, 110). In some examples, the selection may be responsive to a control signal received from a printing device (FIG. 3, 320). For example, a printing device (FIG. 3, 320) may select the particular fluid level sensor (FIG. 1, 110) to test. In another example, the printing device (FIG. 3, 320) merely determines it is time to determine a fluid level and sends this instruction to the controller (FIG. 3, 322). The controller (FIG. 3, 322) then selects (block 601) the particular fluid level sensor (FIG. 1, 110) to evaluate. In some examples, evaluation of the state of the multiple fluid level sensors (FIG. 1, 110) may be sequential. As an example, the first fluid level sensor (FIG. 1, 110) evaluated may be a highest sensor within the chamber (FIG. 1, 101). The testing of individual fluid level sensors (FIG. 1, 110) proceeds downward from that point.

Next, a corresponding control device (FIG. 2, 212) receives (block 602) data from the selected fluid level sensor (FIG. 1, 110). As described above, this may be in the form of a voltage that indicates whether the particular fluid level sensor (FIG. 1, 110) is detecting fluid at a particular location. This data is then compared (block 603) to a threshold value. For example, the voltage from the fluid level sensor (FIG. 1, 110) is compared to a threshold voltage, which threshold voltage is established such that a lower value means the fluid level sensor (FIG. 1, 110) detects fluid, and a greater value means the fluid level sensor (FIG. 1, 110) does not detect fluid.

The corresponding control device (Fig, 2, 212) then determines (block 604) if the fluid level sensor (FIG. 1, 110) is at a no fluid state. This may be performed as described in connection with FIG. 4. If the corresponding fluid level sensor (FIG. 1, 110) is in a fluid state (block 604, determination NO), information indicative of the state of the fluid level sensor (FIG. 1, 110) is passed (block 607) to the controller (FIG. 3, 320). This may be performed as described in connection with FIG. 4.

If the corresponding control device (FIG. 2, 212) determines that the corresponding fluid level sensor (FIG. 1, 110) is in a no fluid state (block 604, determination YES), the control device (FIG. 2, 212) may receive (block 605) a write command, irreversibly sets (block 606) a non-volatile memory device (FIG. 2, 216) to a no fluid state based on this a write command, and passes (block 607) the information indicative of the state of the fluid level sensor (FIG. 110) to the controller (FIG. 3, 322). This may be performed as described in connection with FIG. 4.

The method (600) continues by evaluating (block 608) subsequent fluid level sensors (FIG. 1, 110). Evaluation (block 608) of a fluid level sensor (FIG. 1, 110) refers to the determination of a state of a fluid level sensor (FIG. 1, 110) and subsequent passing of the state information to the controller (FIG. 3, 322). Once all fluid level sensors (FIG. 110) have been evaluated, the controller (FIG. 3, 322) or a controller of the print device (FIG. 3, 320) can determine the fluid level.

In some examples, the method (600) also includes verifying (block 609) that the fluid level sensor (FIG. 1, 110) is in a no fluid state. In other words, the read operation is independent of a sensing operation. In other words, the mere act of selecting a fluid level sensor does not automatically produce a read operation. The fact that the two are separate allows for additional ands on control.

Using such a fluid level sensing device level 1) provides a low cost, high volume, and simple manufacturing process; 2) quickens the fluid level detection cycle; 3) locks in a no fluid state independent of a write signal from a controller; 4) indicates accurate fluid level and is robust against agitation of the container, random fluid drops, and meniscuses that may be present in the container; 5) supports multiple processes for detecting fluid levels; and 6) results in increased customer satisfaction due to the increased performance. However, it is contemplated that the devices disclosed herein may provide useful in addressing other matters and deficiencies in a number of technical areas. Therefore, the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid sensing device comprising:
    a sensing die having a number of fluid level sensors disposed thereon;
    a number of control devices, each control device comprising:
        a comparing device to determine a state of a fluid level sensor of the sensing die, wherein the state of the fluid level sensor is selected from the group consisting of a fluid state and a no fluid state;
        a non-volatile memory device to indicate whether the fluid level sensor is at the fluid state or the no fluid state; and
        a locking device to:
            receive a write command based on output from the comparing device to set a state of the non-volatile memory device to the no fluid state in the non-volatile memory device; and
            irreversibly set the non-volatile memory device to record the no fluid state for the fluid level sensor based on the write command.

2. The device of claim 1, wherein the fluid is ink.

3. The device of claim 1, wherein the non-volatile memory device is a write-once memory device.

4. The device of claim 1, further comprising a sensor coupled to the comparing device.

5. The device of claim 1, further comprising a controller to operate the number of control devices, the controller to:
    select a corresponding fluid level sensor for evaluation;
    provide a threshold value to facilitate detecting whether the corresponding fluid level sensor is at fluid state or a no fluid state; and
    provide the write command, based on output of the comparing device, to initiate the locking device to record in of the non-volatile memory device when the corresponding fluid level sensor is in the no fluid state.

6. The device of claim 5, wherein the controller sequentially selects fluid level sensors from multiple fluid level sensors of the sensing die for evaluation.

7. The device of claim 1, wherein:
    the non-volatile memory device comprises at least a resistive device and a fuse; and
    the locking device comprises at least a transistor, a logic AND device, and a diode.

8. A method for controlling a fluid level sensor comprising:
    determining a state of the fluid level sensor, wherein the state of the fluid level sensor is selected from the group consisting of a fluid state and a no fluid state;
    when the fluid level sensor is in a no fluid state, irreversibly setting a non-volatile memory device corresponding to the fluid level sensor to indicate that the fluid level sensor is in a no fluid state based on a write command from a controller;
    passing information indicative of the state of the fluid level sensor to the controller; and
    verifying operation of the fluid level sensor by comparing a state of a fluid level sensor as indicated in the non-volatile memory with a current output of the fluid level sensor.

9. The method of claim 8, wherein determining a state of the fluid level sensor comprises:
   receiving data from the fluid level sensor; and
   comparing the data from the fluid level sensor to a threshold value to determine whether the fluid level sensor is at a no fluid state.

10. The method of claim 8, wherein the write command is received responsive to passing information to the controller that indicates that the fluid level sensor is in a no fluid state.

11. The method of claim 8, further comprising verifying that the fluid level sensor is in a no fluid state.

12. The method of claim 8, further comprising:
   selecting the fluid level sensor from a number of sensors; and
   evaluating subsequent fluid level sensors.

13. The method of claim 8, wherein the non-volatile memory device comprises a fuse and wherein irreversibly setting the non-volatile memory device comprises blowing the fuse to indicate that the corresponding fluid level sensor is in a no fluid state.

14. The device of claim 1, wherein the number of control devices comprises a separate control device for each of the fluid level sensors of the sensing die.

15. The device of claim 1, wherein the non-volatile memory device comprises a fuse, and wherein irreversibly setting the non-volatile memory device comprises blowing the fuse to indicate that a corresponding fluid level sensor is in a no fluid state.

16. The device of claim 1, further comprising:
   a node at which a state of the non-volatile memory device can be read; and
   a transistor to selectively connect the node to a host device so that the host device can read the state of the non-volatile memory device.

17. The device of claim 16, further comprising a diode to prevent the memory node from being pulled to a low state by a programming voltage.

18. A fluid reservoir comprising:
   a chamber to hold a volume of the fluid; and
   a fluid level sensing device disposed within the chamber, wherein the fluid level sensing device comprises:
      a sensing die to extend into the chamber;
      multiple fluid level sensors disposed on the sensing die, each of the multiple fluid level sensors being positioned at a different depth within the chamber;
      multiple fluid sensor control devices disposed on the sensing die, each of the fluid sensor control devices corresponding to one of the fluid sensors, wherein a fluid sensor control device comprises:
         a comparing device to determine a state of a corresponding fluid level sensor, wherein the state of the fluid level sensor is selected from the group consisting of a fluid state and a no fluid state;
         a non-volatile memory device to indicate whether the corresponding fluid level sensor is at the fluid state or the no fluid state; and
      a locking device to:
         receive a write command, based on output of the comparing device, to set a state of the non-volatile memory device to a no fluid state;
         irreversibly set the non-volatile memory device to a no fluid state based on the write command.

19. The system of claim 18, wherein the fluid is ink.

\* \* \* \* \*